U S 006076991A

United States Patent [19]
Karlsen et al.

[11] Patent Number: 6,076,991
[45] Date of Patent: *Jun. 20, 2000

[54] END CAP SYSTEM FOR SCAFFOLDING PLANKS

[75] Inventors: Stig Karlsen, Burlington; Roger Frank, New Berlin, both of Wis.

[73] Assignee: Safway Steel Products, Inc., Waukesha, Wis.

[ * ] Notice: This patent is subject to a terminal disclaimer.

[21] Appl. No.: 09/078,799

[22] Filed: May 14, 1998

Related U.S. Application Data

[63] Continuation of application No. 08/651,202, May 17, 1996, Pat. No. 5,762,441.

[51] Int. Cl.⁷ .............................. E04G 5/08; E04G 7/00
[52] U.S. Cl. .................... 403/381; 403/362; 403/375; 182/119; 182/222; 182/179.1
[58] Field of Search ................. 182/119, 178.1, 182/178.2, 178.3, 178.4, 178.5, 178.6, 179.1; 403/381, 362, 375, 49, 331

[56] References Cited

U.S. PATENT DOCUMENTS

| | | | |
|---|---|---|---|
| 4,331,218 | 5/1982 | Layher | 182/222 |
| 4,369,859 | 1/1983 | Smits | 182/179 |
| 4,439,052 | 3/1984 | Wallther | 403/49 |
| 4,445,307 | 5/1984 | Puccinelli et al. | 52/638 |
| 4,586,842 | 5/1986 | Puccinelli | 403/246 |
| 4,825,976 | 5/1989 | Wyse | 182/222 |
| 5,070,662 | 12/1991 | Niese | 52/127 |
| 5,106,050 | 4/1992 | Vaccaro et al. | 248/674 |
| 5,141,078 | 8/1992 | Wood | 182/222 |
| 5,240,089 | 8/1993 | Spera | 182/179 |
| 5,279,193 | 1/1994 | Huffine | 182/119 |
| 5,617,909 | 4/1997 | Duginske | 144/253 |
| 5,762,441 | 6/1998 | Karlsen et al. | 403/381 |
| 5,882,136 | 3/1999 | Pyritz et al. | 182/119 X |

FOREIGN PATENT DOCUMENTS

| | | |
|---|---|---|
| 0014 155 A1 | 8/1980 | European Pat. Off. . |
| 0 250 612 A1 | 1/1988 | European Pat. Off. . |
| 0 332 061 A2 | 9/1989 | European Pat. Off. . |
| 0 347 476 A1 | 12/1989 | European Pat. Off. . |
| 0 484 741 A1 | 5/1992 | European Pat. Off. . |
| 29 16 236 | 10/1980 | Germany . |
| 42 27 759 A1 | 8/1991 | Germany . |
| 40 36 026 A1 | 5/1992 | Germany . |

OTHER PUBLICATIONS

Safway One Call. One Source. Equipment and Services for the Construction Industry. ©1996 Safway Steel Products Inc. (Brochure).

United Interlock Grating/United Metalplank Scaffolding ©1984 United McGill Corporation (Brochure).

Tuf–Alum II Alumax Magnolia Division ©1984 Alumax Corporation (Brochure).

Systems Steel Plank (SSP–) (Galvanized) Safway Technical Manual Jan. 1994.

Produkt–Information Thyssen Hünnebeck GMBH Dez. 92 (Brochure).

Louisville Ladder Division, Emerson Electric Co. Scaf–A–Deck and Ladder Jacks (Brochure).

Werner Aluminum Platforms for Steel Scaffolds R.D. Werner Co., Inc. 1975/1985 (Brochure).

*Primary Examiner*—Daniel P. Stodola
*Assistant Examiner*—Bruce A. Lev
*Attorney, Agent, or Firm*—Whyte Hirschboeck Dudek SC

[57] ABSTRACT

An end cap system for scaffolding planks, especially for hollow core planks. The end cap includes an extrusion having a plank-receiving portion on one side and a rib profile on the other for slidingly receiving scaffolding hooks. The end cap permits similar parts to be used for a wide variety of plank widths and allows for replacement of damaged hooks or the exchange of hook configurations. In the most preferred embodiment, the hooks are fixed to the end cap, such as by a set screw, after they are slidingly located at the desired position. The end caps may be used with either "high" or "low" hooks.

19 Claims, 4 Drawing Sheets

END CAP SYSTEM FOR SCAFFOLDING PLANKS

CROSS-REFERENCES TO RELATED APPLICATIONS

This is a continuation of U.S. application Ser. No. 08/651,202 filed on May 17, 1996, now U.S. Pat. No. 5,762,441.

BACKGROUND OF THE INVENTION

1. Field of the Invention

The present invention relates generally to worker-access systems and to planks used with scaffolding systems. In a more preferred form, the present invention relates to an end cap suitable for use with planks, such as hollow core planks. In its most preferred embodiment, the present invention relates to an extruded channel end cap for being placed over the end of a scaffolding plank and for replaceably supporting a plurality of hooks.

2. Description of the Prior Art

A wide variety of scaffolding systems, also called as worker-access systems, are known to the art. The assignee of the present invention markets such systems in the United States, and the major components of its systems include tubular, horizontal plank support members arranged for a particular application and planks which are removably placed on the members to allow workers to stand in desired locations at the construction, renovation or other job locations. A large number of planks now employed in the United States are made from steel. They typically have an upper planar surface which may include opened or roughened areas to allow water and wind to pass therethrough and to provide a non-slip surface for worker safety. Such planks typically include depending side walls and an inward bend at the bottom of each side wall. Hooks adapted to be removably placed over horizontal scaffolding support members are typically welded to the ends of these planks.

While such scaffolding planks have met with considerable commercial success and have been used in many thousands of locations, certain problems remain. The most important is the weight of the steel planks and another is the fact that the hooks are permanently welded to the planks making repair or replacement time consuming and expensive.

It is also well-known that "high" or "low" hooks may be employed with such planks, depending on the complexity of the scaffolding system and on whether it may be desired to have the planking arranged, without spacers, in a side-by-side arrangement. In certain systems the high hooks raise the planking level so that they are above plank couplers. Once such type of connection is shown in U.S. Pat. No. 4,586,842 issued May 6, 1986 and assigned to the assignee of the present invention. The named inventor is Joseph S. Puccinelli, and the patent is entitled "Scaffold Joint For A Scaffold Structure". The horizontal members are illustrated at 18 in the FIGURES and planks may be supported on high hooks so that they pass over the ring connections shown at 22.

It is also known to arrange the hooks to allow the planks to be reversed, from end-to-end without interference. In other words, the opposite ends of an individual plank have the hooks arranged at different locations to facilitate reversibility. It is further known, in existing systems, to employ a hold down finger along with the hooks to prevent wobbling of the plank on the horizontal supports if a worker were to walk along an edge thereof.

Certain technology changes have occurred in recent years, especially in Europe with regarding to scaffolding planks. One such development is described in German Patent No. DE 40 36 026 A1, a copy of which is provided with this specification, along with a non-official translation thereof. The planking system described in this patent is made from a much thinner gauge steel than that used with earlier systems. The planks are configured with a generally planar upper surface and two hollow cores extending the full length thereof. The plank surface and the cores include various corrugations to increase the strength and stiffness of the plank. Such planks provide strength capabilities similar to those of the previously described planks, at a much lower weight. Accordingly, the planks are easier to carry and to erect.

As illustrated and described in a following section of this specification, end caps with lobes are provided in certain European systems for coupling the hollow core planks to a channel shaped support system. The end cap includes a flange adapted to extend long the upper surface of the plank and a bottom flange which fits under the cores. Rivets are used to affix the end cap to the plank. The end cap also includes one or more elongate lobes adapted to be received and held in an elongate channel support. Preferably, the lobe is less than one-half the width of the channel support, so that another plank may be placed in end-to-end relationship with the first plank and be supported by the same channel member.

A variety of other types of planking systems are known in the scaffold art, including planks made from plywood or other kinds of lumber. One known structure includes two steel side members which have slots into which a wood plank is placed. Extruded aluminum ends are permanently attached to the side members. The ends include spaced apart top and bottom plates and an outer edge which extends upwardly and downwardly therefrom. Hooks slide over the outer edge and are welded or otherwise secured thereto. Since the hooks extend outwardly from the outer edge of the channel member, they are located a considerable distance from the plank. During use, stresses are transferred between the side members and the horizontal supports through the hooks. This type of system is also illustrated in the description which follows.

Several difficulties remain with current scaffolding. The interchangeability of hooks for a variety of different scaffold support systems is one problem, especially for scaffolding erection entities which may maintain large inventories of a variety of components. It is also cumbersome in the manufacture of scaffolding planks to use different components for each width of plank. It is also important that stresses generated during use of scaffolding planks be distributed appropriately from the plank to the support system. Furthermore, it is important to recognize the difficulties which can be encountered in replacing bent or broken hooks.

SUMMARY OF THE INVENTION

It is a primary feature of the present invention to provide an end cap system for scaffolding planks which overcomes a number of the disadvantages noted above with prior art systems. The present invention features an end cap system which permits interchangeability of a variety of hook components onto the same end cap, and which allows broken or bent hooks to be replaced easily.

The present invention also features an end cap system which may be used with many different plank widths while minimizing the number of components that would be required.

The present invention further features an end cap system which evenly distributes stresses along the width of the end cap.

The present invention also features an end cap system which may be used with high or low hooks.

How the features of the present invention are provided will be described in the following detailed description of the preferred embodiments taken in conjunction with the drawings. Generally, however, the features are provided for use with a hollow core planking system generally similar to that described above. The inventive system for connecting such planking systems to the scaffolding support systems includes an elongate, preferably extruded end cap which has a plank receiving channel on one side thereof and a series of ribs on the other, profiled for receiving and supporting the hooks. In the most preferred embodiment, the rib profile includes upper and lower ribs which are parallel to one another and two intermediate ribs which are turned extending upwardly and downwardly to define a central portion which is generally in the shape of a truncated "V". The hooks have profiles adapted to mate with the end cap profile so that they may slide thereover to appropriate locations, following which they are secured using, for example, set screws. The end cap itself is suitably adhered to the plank using rivets or other fasteners. The features may also be obtained using certain modifications to the illustrated embodiments without departing from the spirit and scope of the invention. Such modifications are deemed to fall within the scope of the invention if they fall within the scope of the claims which follow.

DETAILED DESCRIPTION OF THE DRAWINGS

In the various FIGURES, like reference numerals are used to illustrate like components.

DETAILED DESCRIPTION OF THE PREFERRED EMBODIMENT

Before proceeding with the detailed description of the preferred embodiments, several comments can be made with regard to the applicability and the scope of the present invention. First, the planking used with the end cap of the present invention is preferably hollow core planking which will be described in connection with FIGS. 1–3 below, but other types of scaffolding planking may be used with the new end caps. The principal advantages of the hollow-core planking are described above. The surface and core configurations for such planking can vary widely, depending on the strength requirements, the degree of fabrication which is permitted for the particular planks and other benefits which, in and of themselves, are well-known in the design of high strength fabricated steel.

Second, the widths and lengths of the plank may be varied as is commonly known with present scaffolding technology.

Figure 5:
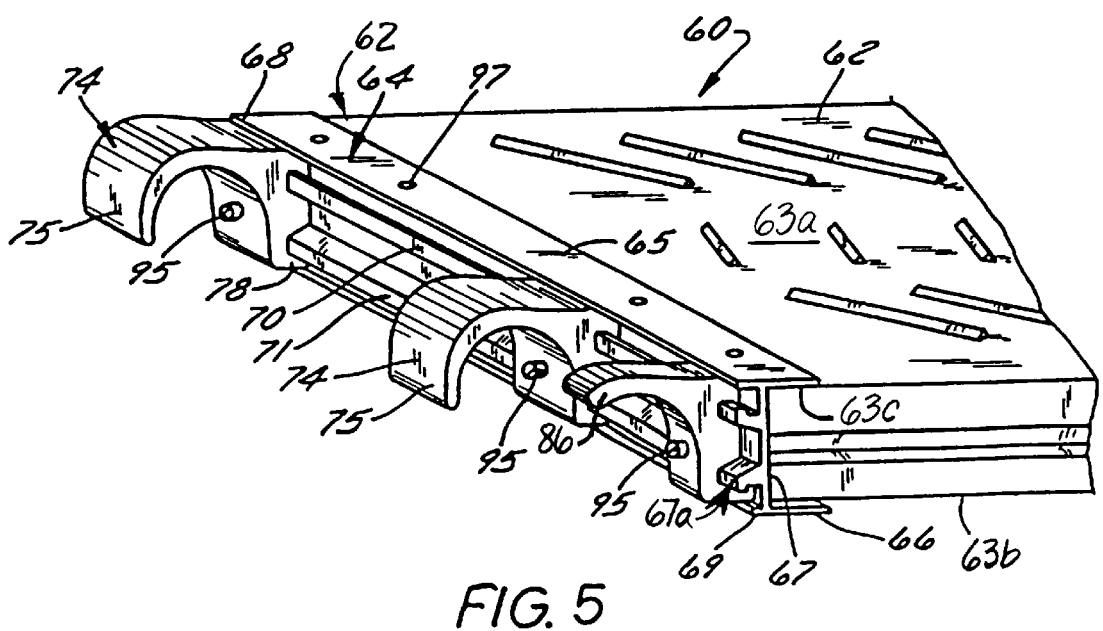
FIG. 5 is a perspective view of the end cap system of the present invention illustrating low hooks and a hollow core plank.
Figure 7:
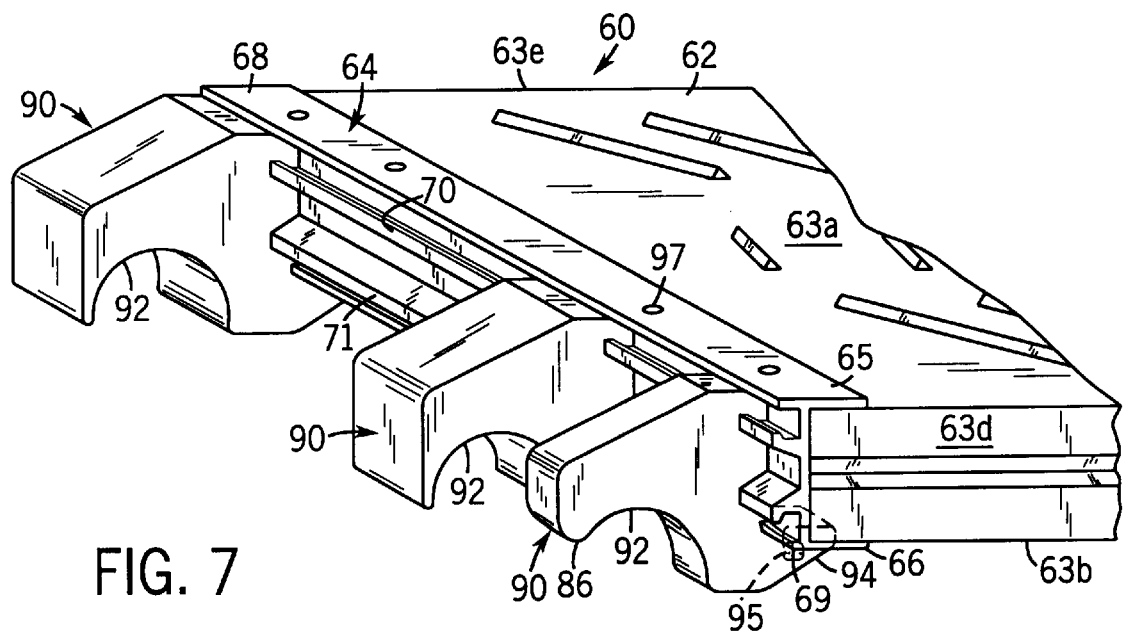
FIG. 7 is a view similar to FIG. 5 but showing high hooks.

Third, two hooks are illustrated in FIGS. 5 and 7 for use with common scaffold support members. The particular dimensions of the hook openings and the number of hooks to be used with the end cap can be varied from those shown in the illustrations.

Fourth, fingers such as the ones shown in FIGS. 5 and 7 are commonly employed with planking systems. Such fingers may advantageously be used to avoid wobbling of the plank as described previously in this specification.

Fifth, while one particular technique is shown for securing the hooks in position on the end cap (namely set screws) other securing techniques may be employed, such as nailing, bolting and the like.

Sixth, the particular materials used in the present invention can be varied. While aluminum is the preferred material for the end cap extrusion and hooks, various other metals and alloys can be employed provided the desired strength, weatherability and other requirements are achieved.

Finally, while the planking may be used with a wide variety of support members, it is particularly well-suited for use with the scaffold structure described and illustrated in the aforementioned U.S. Pat. No. 4,586,842. That patent, and its disclosure, are incorporated herein in their entirety by this reference. That system is particularly useful with high hooks, so that the planks will fit over the circular ring supports.

Figure 1:
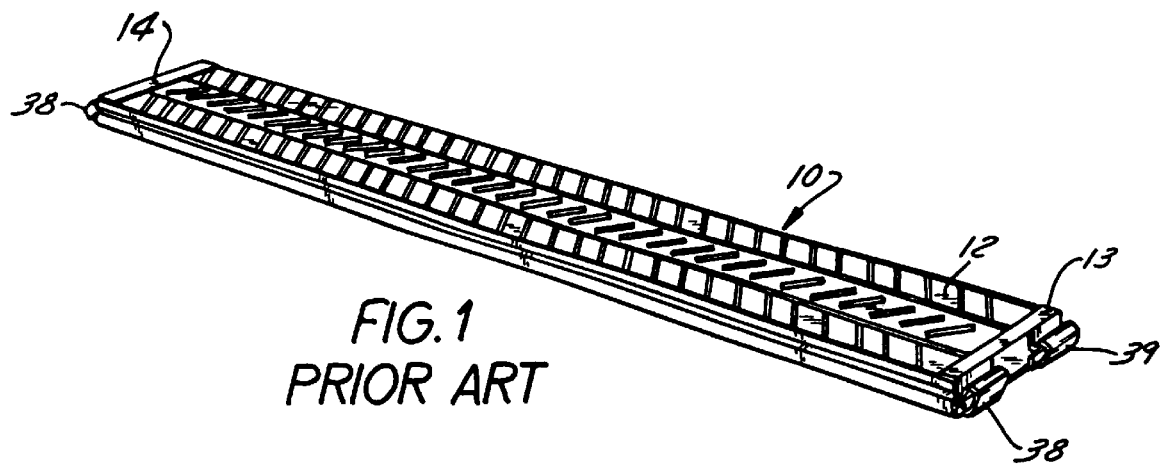
FIG. 1 is a perspective view of a prior art hollow core plank with end caps.
Figure 2:
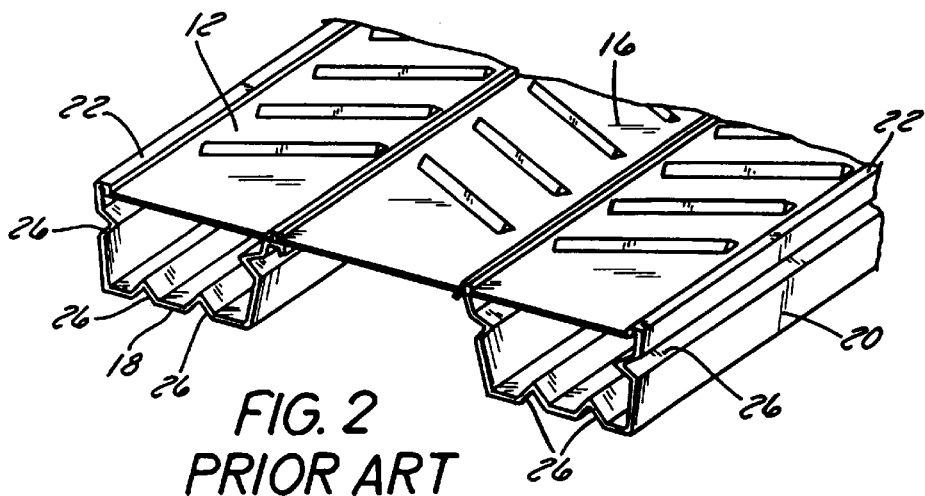
FIG. 2 is a perspective view of a section of the plank shown in FIG. 1.

Proceeding next to a description of the prior art and the preferred embodiments, FIG. 1 shows in perspective view a hollow core planking system 10 which has been used in Germany for the last several years. System plank 10 includes a hollow core plank 12 and a pair of end caps 13 and 14, which end caps are shown in more detail in FIG. 3. The plank 12 is shown in cutaway view in FIG. 2 to include an upper, generally planar surface 16 and a pair of hollow cores 18 and 20 running therebeneath. In the preferred plank, a pair of side edges 22 run along surface 16. A variety of corrugations 26 are shown on the sides and bottoms of cores 18 and 20 and surface fabrications may also be provided as well to increase the strength of plank 12 and to provide a safe walking surface for workers using system 10.

Figure 3:
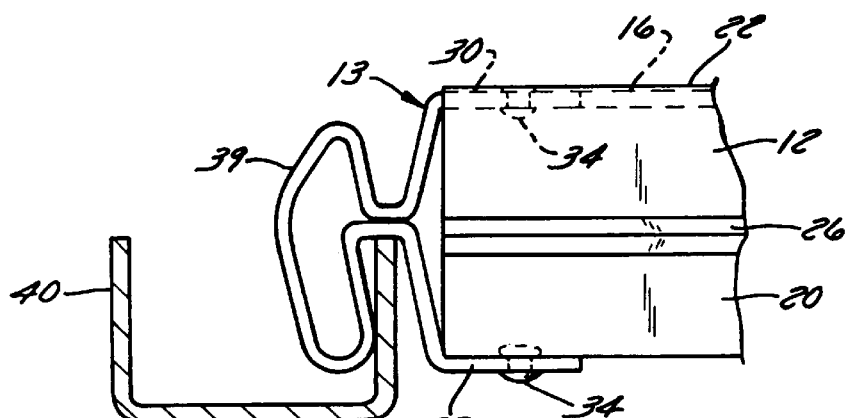
FIG. 3 is a sectional view of one edge of the end cap shown in FIG. 1 in combination with a typical channel support used with such systems.

End cap 13 is shown in FIG. 3 to include an upper flange 30 which contacts the upper surface 16 of plank 12 and a bottom flange 32 that extends below cores 18 and 20 with rivets 34 used to secure the plates to the plank 12. End cap 13 also includes two metal stamped lobes 38 and 39, one at each side of the end cap. The lobes are specially configured to fit within a channel member 40 (see FIG. 3) which is a common scaffolding support member used in Europe as of the date of the preparation of this specification. Channel 40 is wide enough to accommodate a similar lobe from an adjoining plank in a manner which is also known to the art.

The end caps 13 and 14 are prepared by stamping a single piece of metal. If, during use, the lobes 38 and 39 become bent or otherwise damaged, the entire end cap must be replaced by removing rivets 34 and substituting a repaired or replacement unit. Such steps require specialized equipment, as well as a significant inventory of replacement parts.

Figure 4:
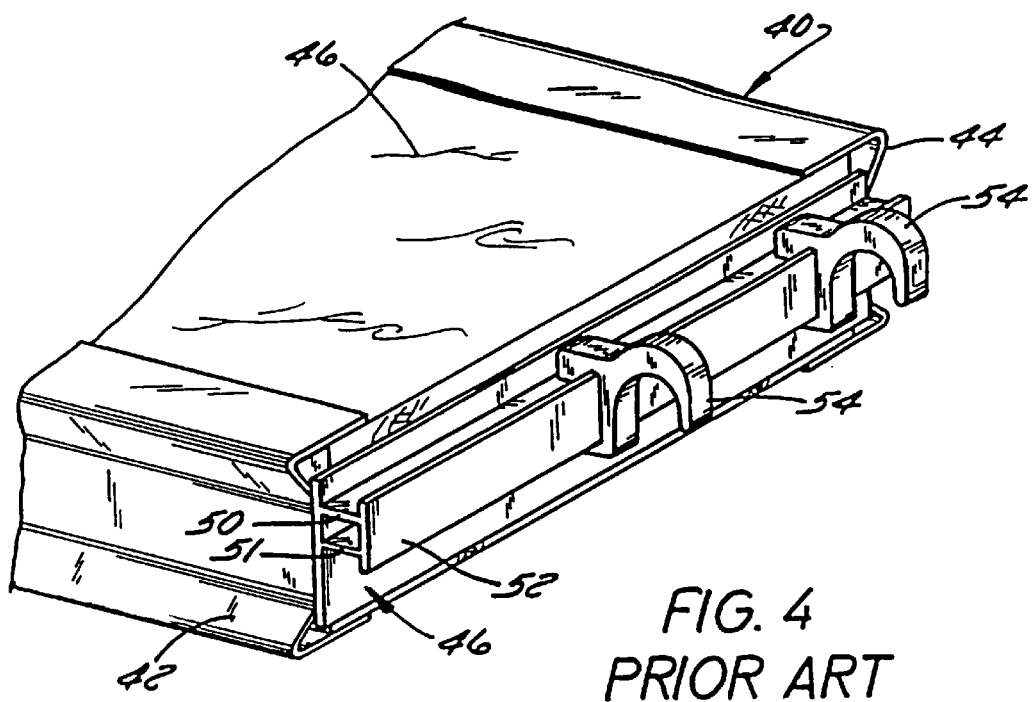
FIG. 4 is a perspective view of a portion of another prior art system employing wooden planks and an extruded end for supporting the scaffolding hooks.

FIG. 4 is a perspective view of another prior art scaffolding system 40, employing a pair of parallel and spaced apart side members 42 and 44 having a wooden plank 46 placed therebetween. The side members are preferably formed with channels to receive the wooden plank. Hooks are attached to the planking system 40 using an extruded end member 46 which is welded to side members 42 and 44 and extends therebetween at a level which is below that of plank 46. The extrusion, in the illustrated embodiment, includes a pair of parallel plates 50 and 51 extending outwardly from the end of plank 46 and terminating in a generally perpendicular end plate 52 having one edge which extends above plate 50 and a lower edge which extends below plate 51. Hooks 54 are placed over the edges of plate 52 and moved therealong to the appropriate location, at which point they are secured. In the illustrated embodiment, a pair of such hooks 54 are utilized. It should be noted in this FIGURE that the hooks extend a considerable distance from the end of the plank 46, creating significant space between the midpoint of the hook opening and edge of the plank.

Figure 6:
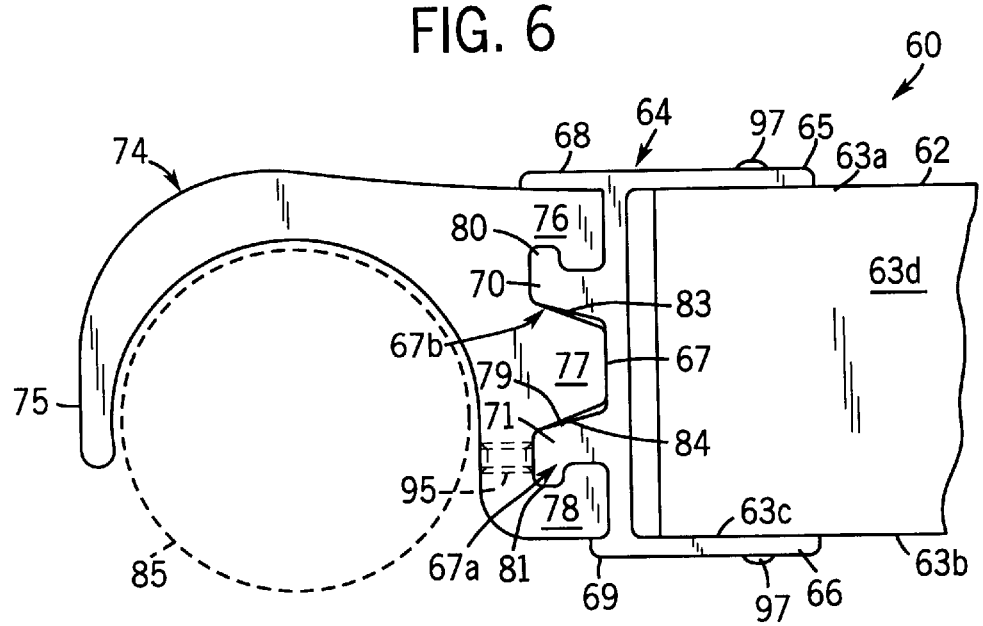
FIG. 6 is a side sectional view illustrating the profile of the end cap and the openings on a low hook to slidingly engage therewith.

The present invention is illustrated in FIGS. 5–7. FIG. 5 shows an end cap and plank system 60 including a plank member 62 having a first end 62a and a second end (not shown) opposite the first end. The plank 62 may be, in the most preferred embodiment, a hollow core plank formed by a top 63a, a pair of side walls 63d and 63e and a bottom 63b. The end cap 64 is shown in each of the three FIGURES to include a U-shaped channel or portion 63c to capture or receive an end (62a) of plank 62 and formed by an upper portion or flange 65, a lower portion or flange 66 and a wall 67 perpendicular to flanges or portions 65 and 66. Extending outwardly from the wall 67 are extensions or plates 68 and 69 to define a hook supporting portion 67a. Also extending outwardly from wall 67 are a pair of ribs 70 and 71 which will be described in detail later herein. The cap is preferably constructed of extruded aluminum.

Hooks 74 are shown in FIG. 5 and 6 and are of the "low hook" variety, meaning they are adapted to be used with horizontal scaffold support members 85 which are at the same level as the planks. Hooks 74 include an outer hook end 75 and a profile end comprising sections 76, 77 and 78. Portion 76 is adapted to be slidingly received between extension or plate 68 and rib 70 which defines a hook receiving area 67b of the end cap 64. Area 77 is adapted to fit between rib members 70 and 71, while portion 78 is adapted to be received between rib 71 and extension or plate 69. The particular configuration of these ribs and portions is not extremely critical to the invention, as long as support is provided for the hooks and so long as the hooks may be slidingly moved to an appropriate location along the end cap 64. However, the illustrated profile is preferred, especially the upturned outer end or bend 80 of rib 70 and the downwardly turned outer end or bend 81 of rib 71. They assist in holding the hook 74. For example, the hook 74 may have protusions 76, 78 constructed and arranged to form channels 88a, 88b which have openings 79a, 79b adapted to slidingly engage the bends 80, 81. Preferably, the protrusions 76, 78 will be U-shaped. The area 77, as illustrated, may also add strength properties to the hook and end cap assembly, especially at the two inclined areas shown as 83 and 84 in the FIGURES. The protrusion 77 is constructed and arranged to be received in the truncated "V" shaped area 87 of the rib wherein the inclined sides 83, 84 of the ribs 70, 71 align with the inclined sides 77a, 77b of the hook protrusion 77.

A high hook embodiment is illustrated in FIG. 7 which, except for the hook configuration, is identical to the embodiment shown in FIGS. 5 and 6. The high hook 90 is used when it is desired to have the planking 62 at a higher level than the horizontal support members. The high hook includes a profile for engagement with the end cap which is identical to that shown in the other FIGURES, although the hook end is shaped differently. Mainly, the semi-circular portion 92 of the hook is arranged at the level of extension or plate 69, and an inner extension 94 is provided on the high hook which lies against lower flange 66 when the hooks are assembled on the end cap. A finger hook 86, as shown in FIGS. 5 and 7 may be used to avoid wobbling of the plank 62.

Figure 6A:
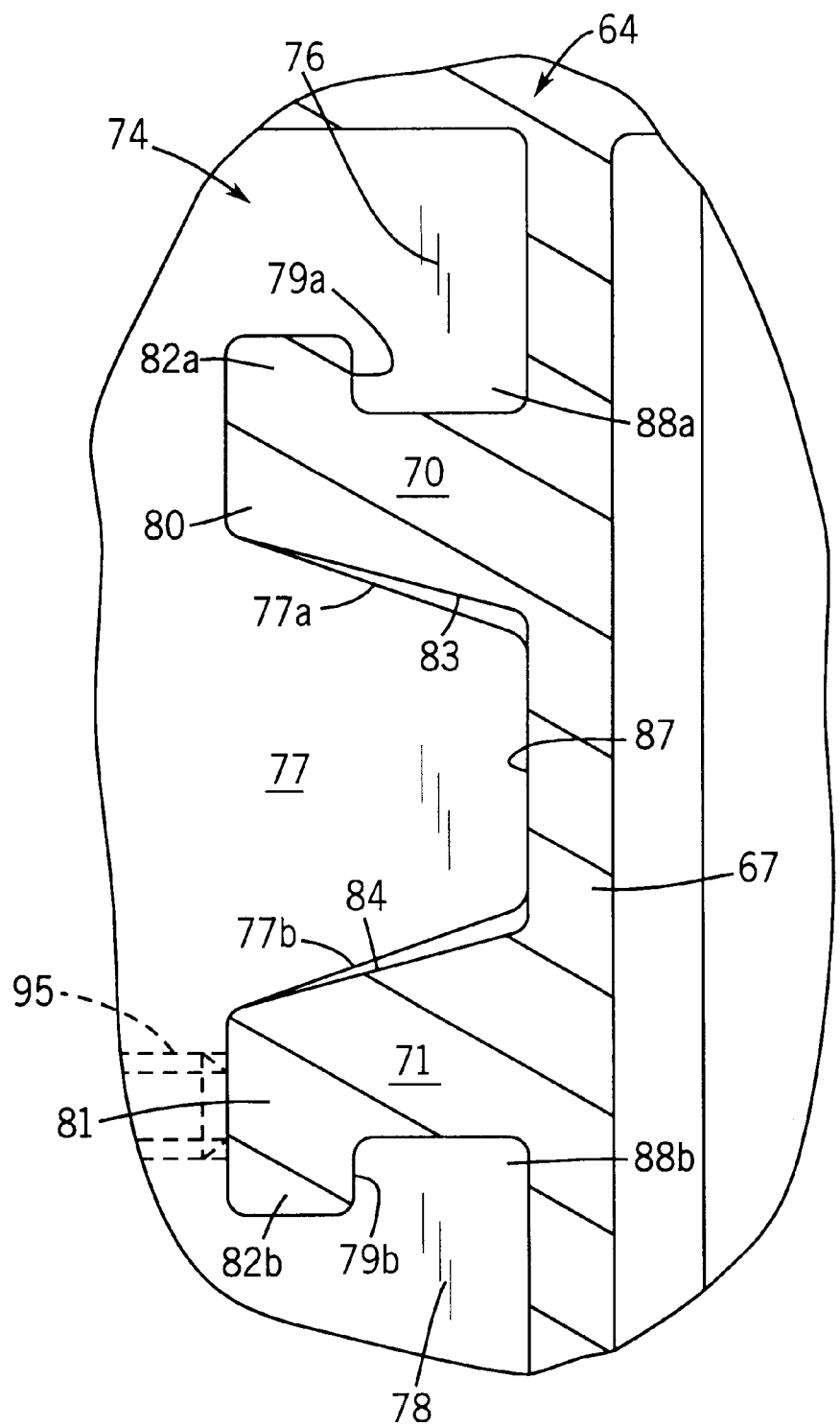
FIG. 6A is a magnified partial sectional generally showing the hook and ribs of FIG. 6.

A variety of fastening techniques may be employed to secure the hooks (74 or 90) to the end cap 64. In the illustrations, a set screw 95 is shown, but as mentioned previously, other fastening techniques such as nailing, bolting or the like may be used. The end cap is riveted or otherwise secured to the plank 62 as shown at 97 in FIGS. 5–7. As best shown in FIG. 6A, the ribs 70, 71 include inclined sides 83, 84 which may end in bends 80, 81 having turned outer ends 82a, 82b and may form a generally U-shaped receiving area. The bends 80, 81 of the ribs 70, 71 may be received by openings 79a, 79b along channels 88a, 88b formed by protrusions 76, 78 of the hook 64.

When the desired width of the plank is determined, the appropriate hooks are slid into position on end cap 64 and are secured thereto by the techniques described above. Should the hooks become damaged, or should they need to be relocated for any reason, the hooks may be moved or replaced at the discretion of the user. It is also contemplated in the present invention that several segments of end cap 64 may be used along an end of the plank, again without departing from the spirit and scope of the invention.

So while the present invention has been illustrated and described in connection with two preferred embodiments, numerous alternatives will appear to those skilled in the scaffolding art after they have read the specification. These alternatives are deemed to fall within the scope of the present invention if they fall within the scope of the claims which follow.

What is claimed is:

1. A scaffolding end cap and plank system comprising:
   an elongate plank having first and second ends, a top, a bottom opposite the top, and side walls together forming a plurality of elongated hollow tubes;
   a cap for each of the first and second ends comprising a generally U-shaped plank receiving channel having a wall, and an upper flange and a bottom flange perpendicular to the wall; and
   fasteners for securing the plank receiving channel about the plank ends.

2. The system of claim 1 further comprising a hook supporting portion which includes a pair of spaced apart plates extending from the wall in a direction opposite of the flanges to define at least one hook receiving area.

3. The system of claim 2 further comprising at least one rib which includes a bend at its outer end to assist in retaining.

4. The system of claim 3 further comprising a hook which has an opening along a channel adapted to slidingly engage the bend.

5. The system of claim 2 further comprising two ribs each of which includes a bend, the bends being directed away from each other.

6. The system of claim 5 wherein each rib includes an inclined area on a side thereof facing the other rib, whereby the inclined area and the wall define the hook receiving area which is in the shape of a truncated "V".

7. The system of claim 6 further comprising at least one hook which has a "U" shaped protrusion adapted to fit within the hook receiving area.

8. The system of claim 2 further comprising at least one hook which has an elongated protrusion adapted to slidingly fit within the hook receiving area.

9. The system of claim 8 wherein a set screw is employed to removably couple the hook to the cap.

10. The system of claim 8 wherein the scaffolding hooks are hooks which allow the plank to rest at the same level as horizontal support members for a scaffolding system.

11. The system of claim 8 wherein the scaffolding hooks are hooks which allow the plank to rest at a higher level than horizontal support members for a scaffolding system, the hooks having a semicircular portion level with the bottom flange of the cap and an inner extension which lies against the bottom flange.

12. The system of claim 1 wherein the upper flange is adapted to be placed against an outside edge of the top of the plank and the bottom flange is adapted to be placed against an outside edge of the bottom of the plank.

13. The system of claim 1, wherein the fasteners are easily removable and are inserted through holes in at least one flange and into holes in the plank to secure the cap to the plank.

14. The system of claim 1, wherein the cap evenly distributes the stress along an end width of the plank and is adaptable to be used with many different plank widths.

15. The system of claim 1 wherein the cap is constructed and arranged to minimize interference with a circular ring connector.

16. The system of claim 1 wherein the fasteners are screws which are received in holes in the cap which are aligned with holes in the plank to secure the cap to the plank.

17. A scaffolding structure comprising:
a plank having a first end and second end;
a cap for each of the first and second ends including a generally U-shaped plank receiving portion and a hook supporting portion;
the generally U-shaped plank receiving portion being defined by an upper flange for extending along a top outer surface of the plank, a bottom flange for extending along a bottom outer surface of the plank, and a wall connecting the upper flange and the bottom flange;
at least one fastener for securing the plank receiving portion to the plank;
a plurality of scaffolding hooks removably coupled to the cap, each of the hooks having channels for engaging the hook supporting portion of the cap; and
horizontal members for supporting the scaffolding hooks.

18. The system of claim 17 wherein the hook is a finger for preventing wobbling of the plank.

19. A scaffolding system for connecting a plank to a scaffolding support structure comprising:
at least one end cap including
a first side having a channel for receiving the plank, and
a second side having a series of ribs including upper and lower ribs which are parallel to one another and two intermediate ribs, one of which is turned upwardly and the other of which is turned downwardly, the intermediate ribs defining a central portion which is generally in the shape of a truncated "V";
at least one hook having a receiving portion which is adapted to mate with the ribs of the end cap in such a way that they can slide along the ribs to appropriate locations along the plank;
at least one fastener for securing the hook at an appropriate location along the end cap; and
at least one fastener for adhering the end cap to the plank.

* * * * *

UNITED STATES PATENT AND TRADEMARK OFFICE
CERTIFICATE OF CORRECTION

PATENT NO. : 6,076,991

DATED : June 20, 2000

INVENTOR(S) : Karlsen, Stig, et al.

It is certified that error appears in the above-identified patent and that said Letters Patent is hereby corrected as shown below:

Front page, second column [57] Abstract, second line: Insert --is disclosed-- after "planks";

Front page, second column [57] Abstract, line 10: Insert --of the present invention-- after "caps".

Signed and Sealed this

First Day of May, 2001

Attest:

NICHOLAS P. GODICI

Attesting Officer

Acting Director of the United States Patent and Trademark Office